(12) United States Patent
Murrell (10) Patent No.: US 10,359,346 B1
(45) Date of Patent: Jul. 23, 2019

(54) SENSORS FOR MONITORING AIRCRAFT SECONDARY LOAD PATHS

(71) Applicant: Rockwell Collins, Inc., Cedar Rapids, IA (US)

(72) Inventor: Andrew S. Murrell, Rancho Cucamonga, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 280 days.

(21) Appl. No.: 15/192,711

(22) Filed: Jun. 24, 2016

(51) Int. Cl.
*G01N 3/08* (2006.01)
(52) U.S. Cl.
CPC ........................... *G01N 3/08* (2013.01)
(58) Field of Classification Search
CPC ........................................................ G01N 3/08
USPC .................................. 73/834; 403/2
See application file for complete search history.

(56) References Cited

U.S. PATENT DOCUMENTS

| | | | | |
|---|---|---|---|---|
| 3,136,154 A * | 6/1964 | Christensen | ........ | G01M 5/0033 73/767 |
| 3,572,091 A * | 3/1971 | McFarland | ............ | G01B 5/30 33/501.03 |
| 3,786,679 A * | 1/1974 | Crites | ........................ | G01L 1/22 73/767 |
| 4,698,623 A * | 10/1987 | Smith | .................. | G08B 21/182 116/212 |
| 7,921,729 B2 * | 4/2011 | Conner et al. | ..... | B64D 45/0005 340/686.1 |
| 8,516,898 B2 * | 8/2013 | Mayer et al. | ............. | B64C 9/18 340/686.1 |
| 8,833,291 B2 * | 9/2014 | Laursen | .................... | G01B 5/14 116/212 |
| 2003/0007844 A1 * | 1/2003 | Terry | .................... | F16B 39/282 411/186 |
| 2007/0250246 A1 * | 10/2007 | Balasu | .................. | B60T 17/221 701/101 |
| 2011/0232562 A1 * | 9/2011 | Koehler | .................. | F03G 7/065 116/216 |

OTHER PUBLICATIONS

Author: David Roylance, Title: Mechanical Properties of Materials, Date: 2008, Publisher: mit.edu, pp. 1-24.*

* cited by examiner

*Primary Examiner* — Jonathan M Dunlap
(74) *Attorney, Agent, or Firm* — Donna P. Suchy; Daniel M. Barbieri

(57) ABSTRACT

A load monitoring device including a substrate having a first surface. The monitoring device further including a conductive portion coupled to the first surface of the substrate comprising a first portion, a second portion, and a failure region separating the first portion and the second portion. The conductive portion is pre-tensioned to induce a failure in the failure region when a predefined amount of tensional force is applied to the substrate.

18 Claims, 8 Drawing Sheets

SENSORS FOR MONITORING AIRCRAFT SECONDARY LOAD PATHS

BACKGROUND

The inventive concepts disclosed herein generally relate to the field of load sensing and monitoring secondary load paths. Specifically, the inventive concepts relate to load sensing and monitoring secondary load paths in an aircraft.

In modern avionic systems, redundant systems are in place for critical systems within an aircraft. These redundant systems can be electrical, mechanical, etc. With regards to modern aircraft systems, a number of secondary load paths relating to mechanical systems within the aircraft may exist. These secondary load paths are required to remain unloaded during normal operation of the aircraft, and only be loaded if the primary system fails, in order to prevent strain or wear on the secondary load paths from accumulating over time. Example aircraft components that require secondary load paths can include stabilizing actuators, wing struts, airfoil linkages, etc. Accordingly, these secondary load paths must be tested and verified to be unloaded during normal operation of the aircraft.

Currently, these secondary load paths are tested using multiple strain gauges installed along a primary and a secondary load path. These strain gauges may monitor a tensioned load on one or more secondary load paths. The strain gauges can then provide the load data to users. In some instances, the strain gauges can be in communication with a central processing station, which may collect the strain gauge data from multiple strain gauges for processing. Further, the strain gauges are often adhered to a surface of a primary or a secondary load path component. This can often permanently attach the strain gauge to the surface of the secondary load path component, thereby preventing the strain gauge from being removed without damaging the strain gauge, and rendering it inoperable for future use. This results in substantially high costs to perform required testing, as strain gauges are often high cost items. Further, the secondary load path component may need to be modified to accept the strain gauge, resulting in additional cost. Additionally, installation of the strain gauges onto the secondary load paths generally requires skilled personnel. Once installed, strain gauges often require calibration to determine the highest fidelity gauge response at various load steps across the entire load spectrum. Further, this calibration is often verified multiple times to determine strain gauge output repeatability, which further increases the cost associated with using strain gauges to verify that no load is placed on the secondary load path components within an aircraft.

Additionally, strain gauges are often susceptible to damage from handling and installation due to the fine wiring and connection terminals within the strain gauges. This can further increase the risk of replacement and recalibration of strain gauges, which further increases the cost associated with using strain gauges to monitor for loading on secondary load paths.

Accordingly, current systems and methods monitoring for a load placed on a secondary load path can be complex and expensive due to the cost and number of strain gauges required to complete the testing, as well as due to the modifications to the components and installation of the strain gauges. Thus, a simple and cost-effective method of monitoring for the presence of a load on a secondary load path may be desirous.

SUMMARY

In one aspect, embodiments of the inventive concepts disclosed herein are directed to a load monitoring device configured to monitor a secondary load path. The load monitoring device includes a substrate having a first surface. The monitoring device further includes a conductive portion coupled to the first surface of the substrate comprising a first portion, a second portion, and a failure region separating the first portion and the second portion. The conductive portion is pre-tensioned to induce a failure in the failure region when a predefined amount of tensional force is applied to the substrate.

In a further aspect, embodiments of the inventive concept disclosed herein are directed to a system for monitoring for the presence of a load on a secondary load path of an aircraft. The system includes a load monitoring device. The load monitoring device includes a substrate having a first surface. The monitoring device further includes a conductive portion coupled to the first surface of the substrate comprising a first portion, a second portion, and a failure region separating the first portion and the second portion. The system further includes a coupling device configured to couple the load monitoring device to a secondary load component. The load monitoring device is configured to deform axially when a tensional force is applied to the secondary load component. The load monitoring device is further configured to induce a failure in the failure region of the load monitoring device when the tensional force is sufficient to overcome the strength of the failure region.

In a further aspect, embodiments of the inventive concept disclosed herein are directed to a method for monitoring loading of a secondary load path. The method includes determining a loading of the secondary load path that cannot be exceeded. The method further includes configuring a load monitoring device to lose electrical conductivity between two points when the loading value has been exceeded. The method also includes coupling the load monitoring device to the secondary load path using a coupling device, and monitoring the load monitoring device to determine when a loss of electrical conductivity has occurred.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of conductive elements, non-conductive elements, coupling devices, etc., and not in the particular detailed configurations thereof. Accordingly, the structure, methods, functions, control and arrangement of components, modules, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language of the claims. Further, while the inventive concepts below are generally directed to avionics applications such as on an aircraft, the inventive concepts should be construed to relate to applications in the aerospace, automotive, structural, transportation, and other industries in which load detection is desired.

As described above, in the avionics industry there are often multiple-redundant systems within an aircraft. For mechanical redundant systems, it is critical that no load be placed on the redundant portions of the system, which are referred to as "secondary load paths." The following disclosure describes embodiments of a load monitoring system that is capable of detecting if a load has been applied to a secondary load path that is simpler and more cost effective than current methods using a number of strain gauges to measure a specific amount of force applied to a secondary load path.

Figure 1:
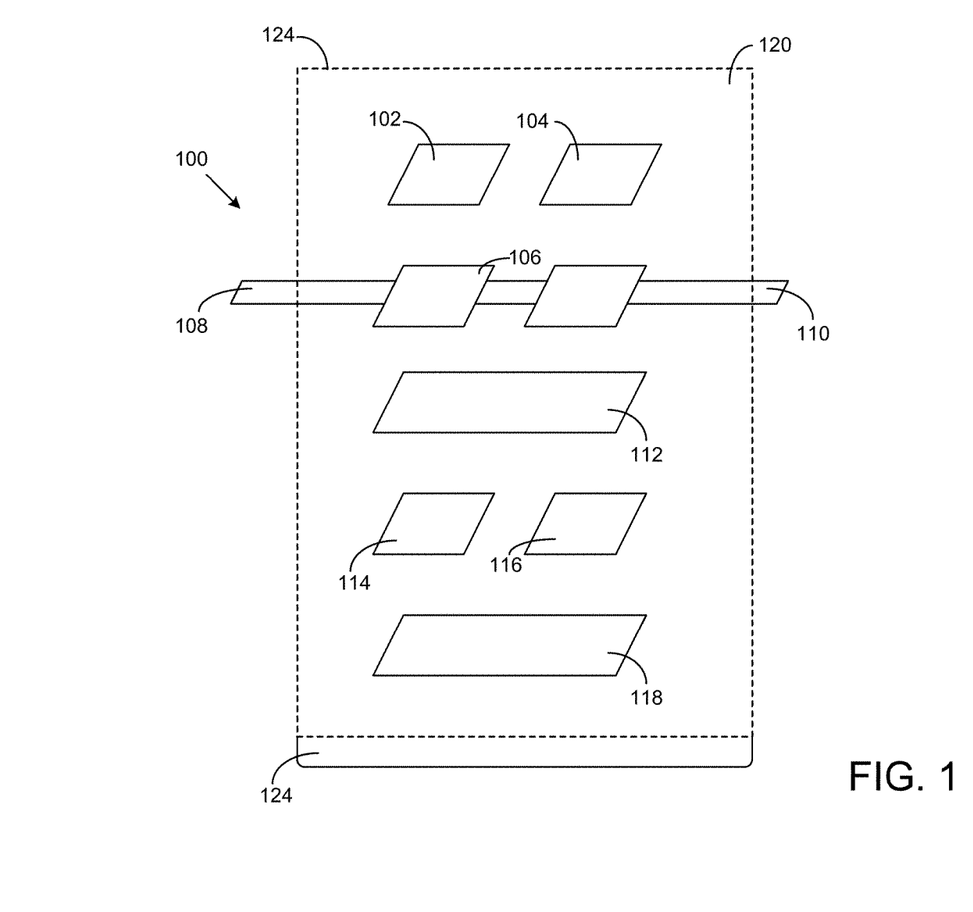
FIG. 1 is an exploded view showing a load monitoring device, according to some embodiments.

FIG. 1 is an exploded view of a load monitoring device 100. The load monitoring device 100 includes upper securing devices 102, 104, and a conductive portion 106 coupled to a number of electrical leads 108, 110. The load monitoring device 100 may further include a substrate 112, a lower securing devices 114, 116, a coupling device 118, and an enclosure 120.

Figure 2:
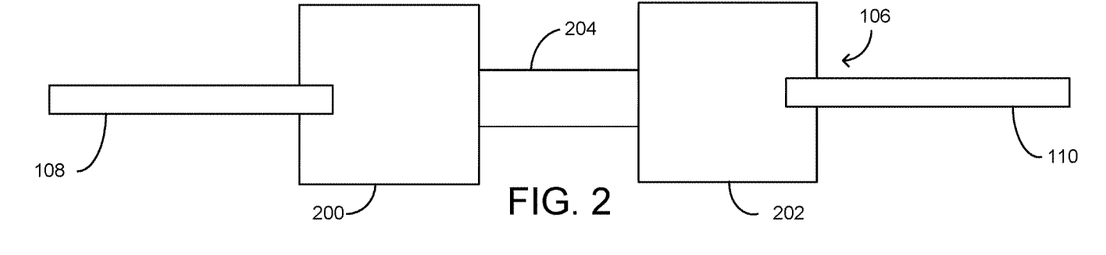
FIG. 2 is an enlarged view of the conductive portion of the load monitoring devices of FIG. 1, according to some embodiments.

The conductive portion 106 may be any conductive material that is capable of passing an electrical current. Turning briefly now to FIG. 2, an enlarged view of the conductive portion 106 is shown, according to some embodiments. As shown in FIG. 2, the conductive portion 106 may include coupling portions 200, 202, and a failure region 204. The failure region 204 is designed to be the section of the conductive portion 106 that fails when a tensional force is applied to the load monitoring device 100. The failure region 204 may be designed to be the weakest point in the conductive portion 106, thereby allowing the conductive portion 106 to act similar to a mechanical "fuse."

Accordingly, in some embodiments, the failure region 204 may have a substantially smaller cross sectional area than the coupling portions 200, 202. For example, the cross sectional area of failure region 204 may be ten percent of the cross sectional area of coupling portions 200, 202. However, the cross sectional area of the failure region 204 may be more than ten percent or less than ten percent of the cross sectional area of the coupling portions. In other embodiments, the failure region 204 may be weakened by scoring or partially cutting the failure region 204 to provide a failure point. The failure, or breakage, of the failure region 204 breaks the electrical continuity of the conductive portion 106, which may be detected via the electrical leads 108, 110. In some embodiments, the failure region 204 is designed to have a known surface area that can be used to determine what amount of force is required to cause a failure in the failure region 204.

In one embodiment, the conductive portion 106 is a conductive foil. The conductive foil may be made of a number of materials, including: steel, copper, aluminum, or other conductive metals. In one embodiment, the conductive foil may have a known thickness. For example, in some embodiments, the conductive foil may have a thickness of 0.02 inches. However, in some embodiments, the conductive foil may have a thickness of more than 0.02 inches or less than 0.02 inches. While the following paragraphs describe the conductive portion 106 as a conductive foil, it is contemplated that other materials may be used for the conductive portion 106. For example, the conductive portion 106 may be a metallic strip or wire. The metallic strip or wire may be weakened at a point to provide a failure region 204, similar to that discussed above. In still further examples, the conductive portion 106 may be constructed of other types of materials such as tubes filled with a conductive liquid or gas and having a compromised area to serve as the failure region 204, such that when a sufficient tensioned force is placed on the tube, there is a fracture at the failure region 204, allowing the conductive liquid or gas to flow out of the tube, thereby breaking the electrical conductivity of the conductive portion 106. Further, other conductive materials are also considered.

In one embodiment, the conductive portion 106 is designed to fail (i.e. create an 'open' condition to break the electrical conductivity through the conductive portion 106) when a tensional load is applied having a certain predetermined force. This can be representative of a secondary load path being loaded in tension, as will be described below. In some embodiments, the conductive portion 106 may be designed and calibrated to fail when a certain level of tensioning force is applied to the conductive portion 106. For example, a failure point of a given material is known, and may be used to configured the conductive portion 106. For example, the failure point of steel is approximately 160,000 pounds of pressure. Thus, using the equation of pressure=force/cross-sectional area, the required size of the failure region 204 can be determined for a given force. For example, if the failure region 204 is required to fail when approximately 60,000 pounds of force is applied, the failure region 204 of the conductive portion 106 is required to have a cross-sectional area of 0.375 in$^2$, where the conductive portion is constructed of steel.

In one embodiment, the conductive portion 106 may be pre-tensioned to allow for the failure region 204 to fail when a desired amount of tensional force is applied. By pre-tensioning, or pre-loading, the conductive portion 106, the conductive portion 106 can be produced in quantity with a uniform cross-sectional area. Accordingly, a single conductive portion 106 design may be able to be placed into a number of monitoring devices 100, and be configured to fail when a certain amount of force is applied via pre-tensioning (pre-loading). For example, if the failure region 204 has a cross-sectional area of 1 in$^2$ and is required to fail when 60,000 pounds of force is applied, the conductive portion 106 can be pre-loaded with 100,000 pounds of force, where the conductive portion 106 is made of steel. In other example, the cross-sectional area of the failure region 204 may be less than 1 in$^2$ thereby requiring substantially less tension to be applied to the conductive portion 106 for a given material. Further, the pre-tensioning may be approximately applied where the load monitoring device 100 is determining whether a load in general was applied to a secondary load path. This can further reduce the cost to manufacture the load monitoring devices 100, as the tolerances associated with the pre-tensioning are not exact.

In one embodiment, the conductive portion 106 may be tensioned using a machine or other device which can apply the required tension to the conductive portion 106. For example, two vises may each clamp onto a portion of the conductive portion 106, such as coupling portions 200, 202. The vises may then be pulled in opposite directions to create the desired amount of tension on the conductive portion. However, other methods of tensioning the conductive portion are considered.

Figure 3:
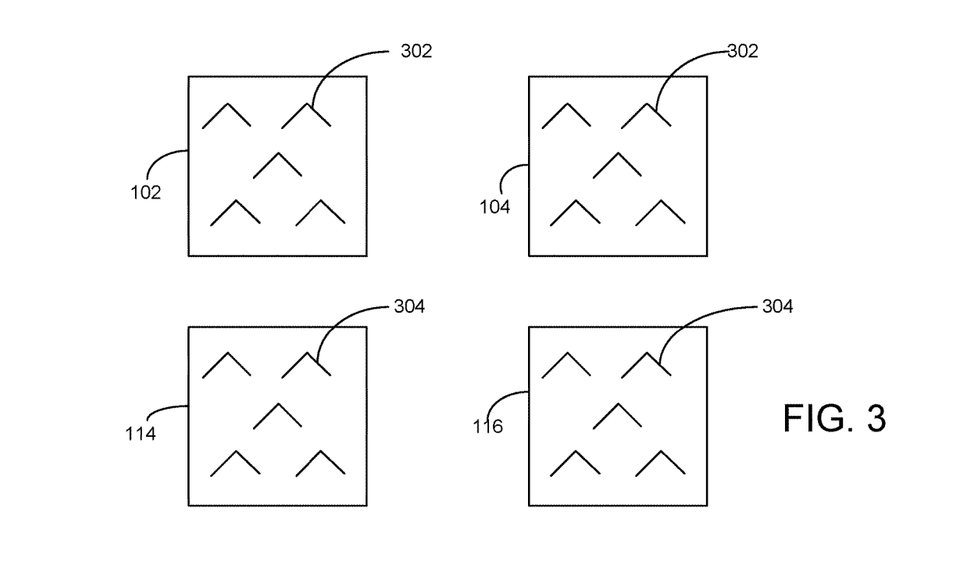
FIG. 3 is a top-down view showing the coupling portions of FIG. 1, according to some embodiments.

Returning now to FIG. 1, the conductive portion 106 can be coupled to the substrate 112 via clamping the coupling portion 200 between the upper securing device 102 and the lower securing device 114, and the coupling portion 202 between the upper securing device 104 and the lower securing device 116. In one embodiment, the upper securing device 102 and the lower securing device 114 are a first clamping device, and the upper securing device 104 and the lower securing device 116 are a second clamping device. As shown in FIG. 1, the upper securing devices 102, 104, and the lower securing devices 114, 116 can sandwich the coupling portions 200, 202 and the substrate between the securing devices 102, 114, 104, 116. Turning to FIG. 3, a top down view of the securing devices 102, 104, 114, 116 is shown, displaying the surface of the securing devices 102, 104, 114, 116 in contact with the conductive portion 106 and/or the substrate 112. In some embodiments, the upper securing devices 102, 104 may have a number of rigid gripping surfaces 302 that are in contact with the conductive portion 106 when the upper securing devices 102, 104 are placed in contact with the conductive portion 106. In one example, the rigid gripping surfaces 302 are triangular teeth that extend through the conductive portion 106 and into substrate 112 to secure the conductive portion 106 to the substrate 112. In other examples, the rigid gripping surfaces 302 may be formed in other shapes, such as conical shapes, cylindrical shapes, pyramidal shapes, etc. Similarly, the lower securing devices 114, 116 may also have a number of gripping surfaces 304 that are in contact with the substrate 112, when the lower securing devices 114, 116 are placed in contact with the substrate 112. In one embodiment, the gripping surfaces 304 may extend through the substrate 112 and into the conductive portion 106, to further secure the conductive portion 106 to the substrate 112. Similar to the gripping surfaces 302, the gripping surfaces 304 may be in the form of triangular teeth. Alternatively, the gripping surfaces 302, 304 may be conical, cylindrical, pyramidal, or any other shape configured to secure the conductive portion 106 to the substrate 112. In some examples, the gripping surfaces 302, 304 may be load spreading fasteners or adhesives.

In some embodiments, the securing devices 102, 104, 114, 116 can provide a securing force sufficient to hold a tension in a pre-tensioned conductive portion 106 as described above. In one embodiment, the conductive portion 106 can be held in tension, and the securing devices 102, 104, 114, 116 can be pressed into the conductive portion 106 to secure the conductive portion 106 to the substrate 112 while maintaining the tension. Subsequently, any excess material may be removed from the conductive portion 106, once the conductive portion 106 is secured to the substrate 112.

The securing devices 102, 104, 114, 116 may be made of a non-conductive material, such as ABS plastic, polymer, or fiberglass. In other examples, the securing devices 102, 104, 114, 116 may be constructed out of metal (e.g. steel, copper, or aluminum) and further have a non-conductive coating applied to the outside to prevent the securing devices from creating an electrical connection with other conductive devices, such as the secondary load path components. Additionally, the gripping surfaces 302, 304 may be made of the same material as the securing devices 102, 104, 114, 116. For example, the gripping surfaces 302, 304 may be made of a non-conductive material to prevent a short circuit forming between the securing devices 102, 104, 114, 116 and a component coupled to the load monitoring device 100. In other examples, the gripping surfaces 302, 304 may be a separate material from the securing devices 102, 104, 114, 116. For example, the gripping surfaces 302, 204 may be made of a conductive metal (steel, copper, or aluminum) while the securing devices 102, 104, 114, 116 may be constructed of a non-conductive material (e.g. fiberglass, plastic, or polymer). In still further embodiments, the securing devices 102, 104, 114, 116 may be other types of securing devices, such as screws, rivets, clamps, load spreading fasteners, adhesives, or any other devices sufficient to couple the conductive portion 106 to the substrate 112, while maintaining any pre-tensioned force on the conductive portion 106.

Returning now to FIG. 1, the securing devices 102, 104, 114, 116 can couple the conductive portion 106 to the substrate 112, as described above. In one embodiment, the substrate 112 is a non-conductive material such as fiberglass (FR4), carbon fiber, plastic (e.g. ABS), etc. In a further embodiment, the substrate is constructed of a rigid material (fiberglass, carbon fiber, or ABS plastic) to reduce the effects of deflection, which may put addition pressure on the conductive portion 106, resulting in false indications of a load being present on a secondary load path. Further, the substrate 112 will generally have a substantially greater thickness than the conductive portion 106. For example, the substrate 112 may have a thickness that is ten-times greater than the thickness of the conductive portion 106. Additionally, the substrate 112 may have a thickness that is more than ten-times greater than the thickness of the conductive portion 106, or less than ten-times greater than the thickness of the conductive portion 106.

The electrical leads 108, 110 can be coupled to the conductive portion 106. For example, the electrical lead 108 may be coupled to the coupling portion 200, and the electrical lead 110 may be coupled to the coupling portion 202. In one embodiment, the electrical leads 108, 110 are coupled to the conductive portion 106 by soldering the electrical leads 108, 110 to the conductive portion. In other embodiments, the electrical leads 108, 110 are coupled to the conductive portion 106 by clamping the electrical leads 108, 110 to the conductive portion 106 using the securing devices 102, 104, 114, 116 to compress the electrical leads 108, 110 to the conductive portion. In other embodiments, the electrical leads 108, 110 may be coupled to the conductive portion using other coupling mechanisms, such as ultrasonic welding.

In some embodiments, the electrical leads 108, 110 are further coupled to a monitoring device which detects a loss in continuity. The loss of continuity indicates that a tensioning load was placed on the secondary load path. In some embodiments, the monitoring device may place a small electrical voltage onto one of the electrical leads, such as electrical lead 108. The voltage may be received by the other electrical lead, such as electrical lead 110, where the failure region 204 of the conductive portion 106 is intact. The monitoring device may then determine that no load has been applied where the voltage is present on both electrical leads 108, 110. However, where the failure region 204 has been compromised, the voltage will not be present at electrical lead 110, which can be processed by the monitoring device to provide an indication that a load was applied to the secondary load path. In some embodiments, a user may perform a continuity check on the load monitoring device 100 at the end of a test, such as a flight test of an aircraft. The user may use a continuity tester (e.g. ohmmeter) to determine if there is continuity between the two electrical leads 108, 110. If there is continuity, no load sufficient to compromise the failure region 204 was experienced by the load monitoring device 100. If there is no continuity, a load sufficient to compromise the failure region 204 was experienced by the load monitoring device 100, indicating that the secondary load path coupled to the load monitoring device 100 experienced tensional loading during the test.

The load monitoring device 100 further includes the coupling device 118. In one embodiment, the coupling device 118 is used to couple the load monitoring device 100 to a secondary load path. The coupling device 118 may be coupled to the underside of the substrate 112 (i.e. the side of the substrate not in contact with the conductive portion). In some embodiments, the coupling device 118 may be coupled to the underside of the substrate 112 as well as the lower securing devices 114, 116. In some embodiments, the coupling device 118 is used to couple the substrate 112 to the enclosure 120. Specifically, the coupling device 118 may couple the substrate to a bottom plate 122 of the enclosure 120. The coupling device 118 may be a coupling device generally used in strain gauge applications. In some embodiments, the coupling device 118 is an adhesive. For example, the coupling device 118 may be a fast acting superglue, a methacrylate mixture, or various epoxy resins. The coupling device 118 may be a single part adhesive or a two-part adhesive. The coupling device 118 may further be a cold-curing adhesive or a hot-curing adhesive. The type of adhesive may be selected based on the type of application, or the material of the surface that the load monitoring device 100 is being attached to. In other examples, the coupling device 118 may be a fastener, such as screws, bots, clamps, etc. In other examples, the coupling device 118 may be a welded connection, such as an ultrasonic welding connection. Generally, the coupling device 118 must be sufficiently rigid such that any tensional force placed on the secondary load path to which the coupling device 118 is used to attach the load monitoring device 100, is applied directly to the substrate 112. If the coupling device 118 is not sufficiently rigid, the coupling device 118 may stretch or deform when the tensional force is applied to the secondary load path, thereby preventing the tensional load from being received by the substrate 112.

The load monitoring device 100 may optionally be located within the enclosure 120. The enclosure, includes a bottom plate 122 and a housing 124. The enclosure 120 may provide environmental protection for the load monitoring device 100. In one embodiment, the enclosure 120 may be sealed against ingress of environmental elements, such as dust, airborne particulates, or water. In one embodiment, the enclosure 120 is constructed of a non-conductive material, such as polymer, ABS plastic, or fiberglass. In other examples, the enclosure 120 may be constructed of a conductive metal, such as steel, aluminum, cast iron, etc. In one embodiment, the enclosure 120 may be constructed to comply with aircraft certification/testing standards, such as those established by the Federal Aviation Agency (FAA).

The bottom plate 122 of the enclosure 120 may couple to the load monitoring device 100. For example, the surface of the substrate 112 opposite the conductive portion 106 may be coupled to the bottom plate 122 via the coupling device 118. As described above, the substrate 112 is to be rigidly attached to the bottom plate 122, such that any tensional forces from a load path component are passed to the substrate 112. The bottom plate 122 may be coupled to a load path component via an enclosure coupling device 126. The enclosure coupling device 126 may be the same type of device as the coupling device 118. For example, the enclosure coupling device 126 may be an adhesive, such as those described above. Alternatively, the enclosure coupling device can be one or more fasteners (screws, bolts, clamps). In further embodiments, the bottom plate 122 may be welded or otherwise permanently attached to a load path component. The bottom plate 122 is coupled to the load path component such that any tensional force on the load path device is passed to the bottom plate 122, as well as to the substrate 112. The housing 124 may be coupled to the bottom plate 122 using various coupling methods, including fasteners, adhesives, clamps, rivets, or other coupling mechanism suitable for the desired level of environmental protection. In some examples, the housing may include openings (not shown) to allow for the electrical leads 108, 110 to exit the enclosure 120. The openings may be configured to maintain the environmental rating of the enclosure 120.

Figure 4:
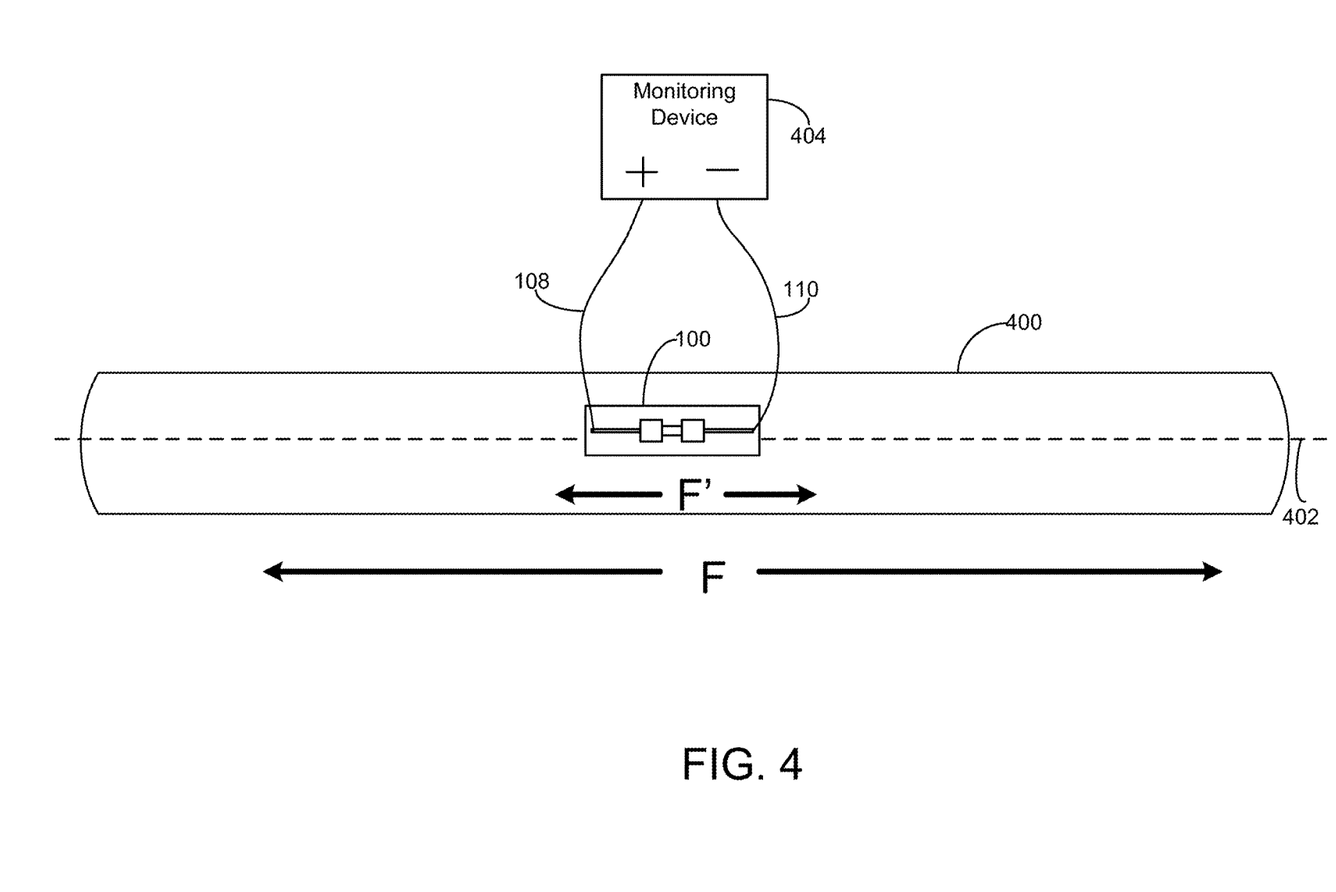
FIG. 4 is a system view showing the load monitoring device of FIG. 1 coupled to a secondary load component, according to some embodiments.

Turning now to FIG. 4, the load monitoring device 100 coupled to a secondary load component 400 is shown, according to some embodiments. The secondary load component 400 may be any structure or device that is not intended to experience a primary load during operation. In one embodiment, the secondary load component 400 may be a secondary load path component of an aircraft, such as a back-up stabilizing actuator, wing strut, flap controller, landing gear strut, control cabling, etc. In one embodiment, the load monitoring device 100 is coupled to the secondary load component 400 using a coupling device, such as the coupling device 118. The load monitoring device 100 may be attached to any point of the secondary load component 400 where tensional loading may occur. No special connections or designs need to be incorporated into the secondary load component 400 to install the load monitoring device 100.

During normal operation, the secondary load component 400 should not experience any tensional loading. However, in some instances a tensional loading force F may be applied to the secondary load component 400. For example, the tensional loading force F may be applied to the secondary load component 400 where there is an improper installation of the secondary load component 400. Further, the tensional loading force F may be applied to the secondary load component 400 where there is a failure or weakening of an associated primary load component. The tensional force F results in the secondary load component 400 deforming along a lateral axis 402. This deformation is further transmitted to the load monitoring device 100, in the form of force F'. In general, force F is equal to force F'. When the force F' exceeds a certain value, the axial deformation of the load monitoring device 100 can cause a failure in the failure region 204 of the conductive portion 106 of the load monitoring device 100. This breaks the continuity of the conductive portion 106, which can be monitored via the electrical leads 108, 110, as described above. In one embodiment, the electrical leads 108, 110 may be coupled to a monitoring device 404. The monitoring device 404 may detect a failure in the failure region 204 indicated by a loss of continuity. In one embodiment, the monitoring device 404 is a continuity tester, such as an ohmmeter. However, in other embodiments the monitoring device 404 is a data collection device, or other device configured to monitor one or more load monitoring devices 100.

For example, assuming that the conductive portion 106 is made of steel foil and that the failure region 204 has the dimensions described above (e.g. a cross sectional area of 1 in$^2$), the force F' required to compromise the failure region 204 would be approximately 160,000 pounds (assuming the failure point of the steel is 160,000 lbs/in$^2$). However, in some instances the conductive portion 106 may be pre-tensioned. For example, the conductive portion 106 described above may be tensioned to approximately 100,000 pounds, thus, the force F' would only need to be 60,000 pounds to compromise the failure region 204. This provides flexibility in setting the amount of force required to compromise the failure region 204 of the load monitoring device 100. Other methods, such as changing the cross-sectional area of the failure region 204, or the material of the conductive portion 106 can further be used to alter the amount of force F' required to compromise the failure region 204.

The above examples using the load monitoring device 100 are directed to use in an avionics platform, such as an aircraft, to determine when a load is present on certain secondary load components. However, the above load monitoring device 100 can be used in other applications such as monitoring goods in transport, or monitoring the structural integrity of structures such as buildings, roadways, ships, etc. Further, the load monitoring device 100 may be used to monitor for a maximum loading of a component. For example, the load monitoring device 100 above may be configured to have the failure region 204 fail when a predetermined level of tensional force is applied. For example, if the maximum loading from a tensional force of a component is 20,000 pounds per in$^2$, the above load monitoring device 100 having a failure region 204 constructed of a steel foil, having a cross-sectional area of 1 in$^2$, may be pre-tensioned to 140,000 pounds to allow for the failure region 204 to be compromised when the tensional force applied to the load monitoring device 100 through the secondary load component is 20,000 pounds. However, the maximum force can be set using other methods described above (e.g. change in material of conductive portion 106, or change in cross-sectional area of the failure region 204).

Figure 5:
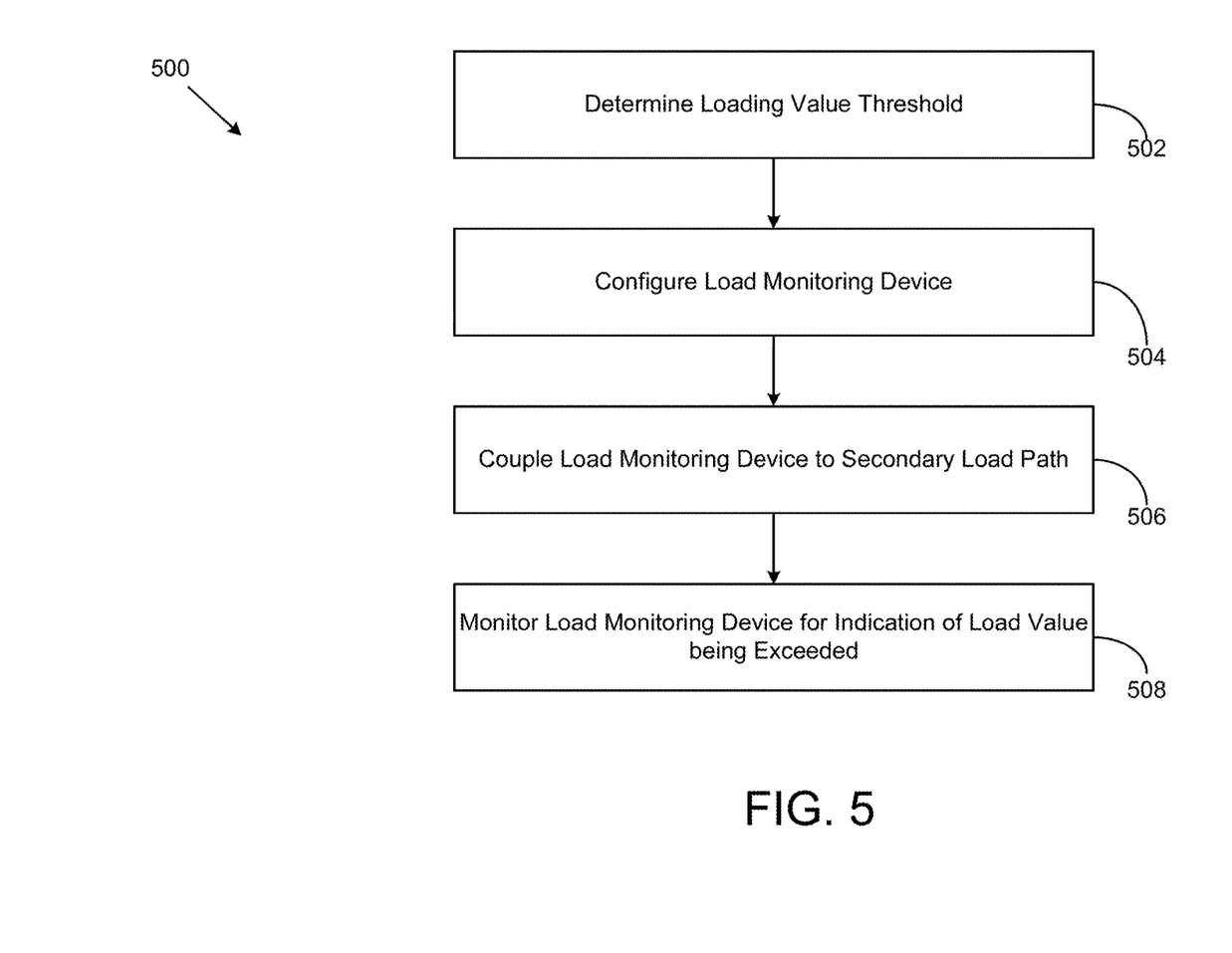
FIG. 5 is a flow chart illustrating a process monitoring for a load on a secondary load path using a load monitoring device, according to some embodiments.

Turning now to FIG. 5, a flow chart is shown illustrating a process 500 for monitoring loading of a secondary load path. At process block 502 a user may determine the threshold tensional loading value that is to be monitored for on the secondary load path. For example, the user may determine that a tensional load of more than 10,000 pounds should not be exceeded on the secondary load path. However, tensional load values of more than 10,000 pounds or less than 10,000 pounds are also considered. Once the user has determined the threshold tensional loading value, a load monitoring device can be configured at process block 504. The load monitoring device may be the load monitoring device 100 described above. For example, the load monitoring device may be configured such that a failure region of a conductive path of the load monitoring device fails when a certain amount of tensional force is applied to the load monitoring device. In one embodiment, the conductive portion may be pre-tensioned, as described above. In other examples, the material of the conductive portions may be changed, and/or the cross-sectional area of the failure region may be configured to modify the force required to induce a failure in the failure region of the load monitoring device.

At process block 506, the load monitoring device is coupled to the secondary load path. As described above, the secondary load path may be a component of an avionics system, such as an aircraft. However, the secondary load path may be any object subject to tensional forces. In one embodiment, the load monitoring device is coupled to the secondary load path using a coupling device, such as the coupling device 118 described above. However, in other embodiments the load monitoring device may be coupled to the secondary load path via other mechanisms, such as welding, bolting, screwing, strapping, etc. Once the load monitoring device is coupled to the secondary load path, the load monitoring device can be monitored at process block 508. For example, a monitoring device, such as monitoring device 404 described above, may be used to monitor the load monitoring device to determine if the failure region has failed.

Figure 6:
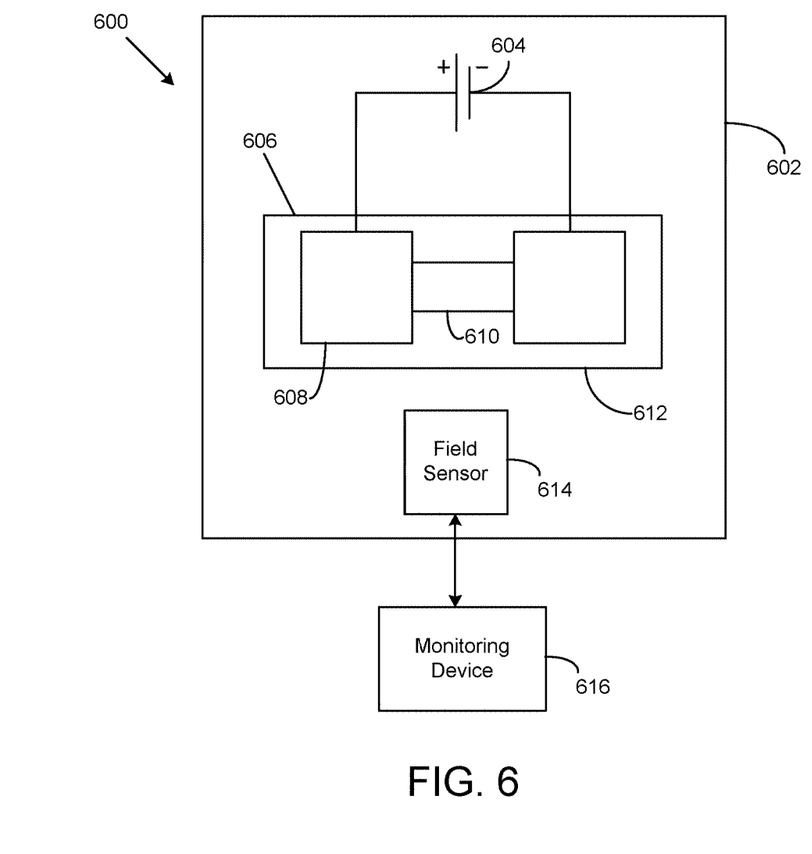
FIG. 6 is a system view showing the an alternative embodiment of the load monitoring device of FIG. 1, according to some embodiments.

Turning now to FIG. 6, an alternative embodiment of a load sensor 600 is shown, according to some embodiments. The load sensor 600 includes an enclosure 602, a battery 604, a sensing portion 606 including a conductive portion 608 having a failure region 610 and mounted to a substrate 612, and a field sensor 614. The sensing portion 606 may be constructed similarly to, and have the same functionality as the load monitoring device 100, described above. In the embodiment shown in FIG. 6, a separate method of detecting a failure in the failure region 610 by monitoring a magnetic or electrical field associated with the conduction in the failure region 610 is described.

The battery 604 is wired to the conductive portion 608 to provide a voltage differential across the conductive portion 608, as shown. The voltage differential produces both magnetic and electric fields near the conductive portion 608. The electrical and/or magnetic field sensor 614 is positioned in proximity to the conductive portion 608. Upon a failure of the conductive portion 608, the magnetic and electrical fields will collapse, which may be detected by the field sensor 614. The field sensor 614 may then communicate the change in the electrical and/or magnetic field to a monitoring device 616, which can detect the failure. In some embodiments, the field sensor 614 may have a wired connection to the monitoring device 616. In other embodiments, the field sensor may communicate with the monitoring device 616 via a wireless communication protocol, such as near field communications (NFC), Bluetooth, RFID, or other wireless communication protocol. The monitoring device 616 may be a dedicated data monitoring device. In other embodiments, the data monitoring device 616 may be a general purpose device such as a personal computer (PC) or laptop (Apple, Mac, Linux), a smart phone (Apple iPhone, Android Phone, Windows Phone), a tablet computer (Apple iPad, Microsoft Surface, Android Tablet), or other general purpose device configured to receive a signal from the field sensor 614.

Figure 7A:
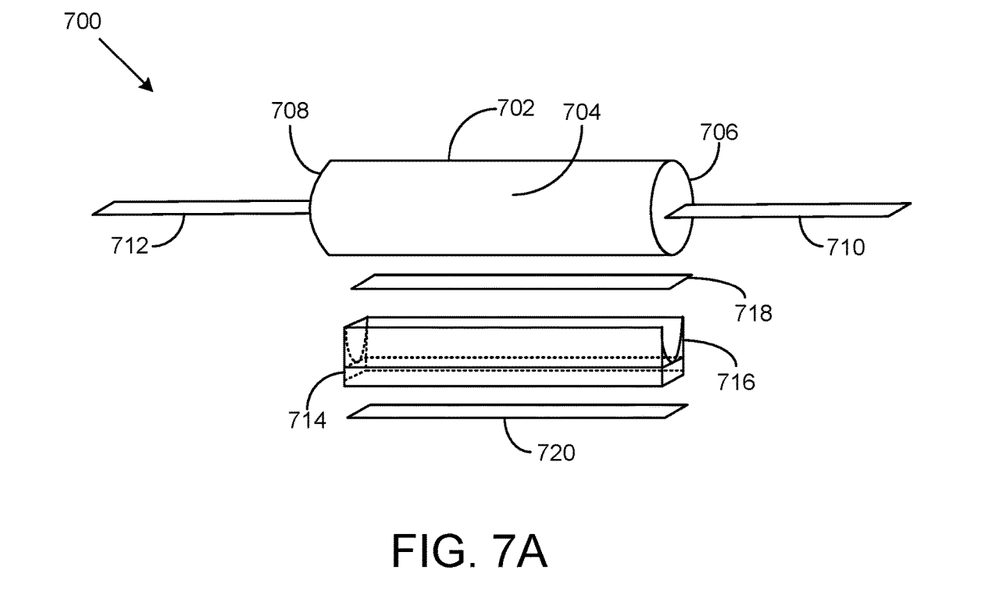
FIGS. 7A and 7B are exploded views showing alternative embodiments of a load monitoring device.

Turning now to FIGS. 7A-7B, additional embodiments of a conductive portion of a load monitoring device are shown. In FIG. 7A, the load monitoring device 700 includes a pressure sealed, non-conductive pressure vessel 702. In one embodiment, the non-conductive pressure vessel of FIG. 7A is a cylinder. In further embodiments, the non-conductive pressure vessel 702 may also be a glass cylinder. The non-conductive pressure vessel 702 may be constructive from plastic, fiberglass, porcelain, ceramic, or other rigid material that may fail (e.g. rupture, crack, shear, etc.) when a sufficient tensional force is applied. The non-conductive pressure vessel 702 is filled with a conductive substance 704. In one embodiment, the conductive substance 704 is a conductive gas. In other embodiments, the conductive substance 704 is a conductive liquid. The non-conductive pressure vessel 702 may further have a number of conductive end caps. In one embodiment, a first conductive end cap 706 is located at a first end of the non-conductive pressure vessel 702, and a second conductive end cap 708 is located at a second end of the non-conductive pressure vessel 702. The conductive end caps 706, 708 may be coupled to the ends of the non-conductive pressure vessel 702 to seal the conductive substance 704 within the non-conductive pressure vessel 702, and to create a conductive path between the conductive end caps 706, 708 and through the conductive substance 704. In one example, the conductive end caps 706, 708 are sonically welded to the non-conductive pressure vessel 702. In other embodiment, the conductive end caps 706, 708 are soldered to the non-conductive pressure vessel 702.

Electrical leads 710, 712 may be coupled to the conductive end caps 706, 708, respectively. For example, the electrical leads 710, 712 may be soldered to the conductive end caps 706, 708. The electrical leads 710, 712 may be further coupled to a monitoring device (not shown), such as the monitoring devices described above. The monitoring device may determine if there is electrical continuity between the electrical leads 710, 712, thereby indicating that the conductive substance 704 is contained within the non-conductive pressure vessel 702. The load monitoring device 700 may further include a substrate 714. Similar to above, the substrate 714 may be constructed of fiberglass, plastic, etc. In one embodiment, a first surface of the substrate 714 can be shaped to correspond with the shape of the non-conductive pressure vessel 702. For example, the substrate 714 of FIG. 7A is shown to include a semi-circular portion 716 which is configured to cradle the non-conductive pressure vessel 702. This ensures a maximum surface area of the non-conductive pressure vessel 702 is in contact with the substrate 714, such that any tensional force applied to the substrate 714 is evenly distributed to the non-conductive pressure vessel 702. A pressure vessel coupling device 718 may be used to couple the non-conductive pressure vessel 702 to the substrate 714. In one embodiment, the pressure vessel coupling device 718 may be an adhesive, such as those described above. In other embodiments, the pressure vessel coupling device 718 may be an ultrasonic weld. The pressure vessel coupling device 718 must be sufficiently rigid to thoroughly transmit any tensional loading presented to the substrate 714 to the non-conductive pressure vessel 702.

A substrate coupling device 720 is further shown. The substrate coupling device 720 is configured to couple the substrate 714 to a secondary load path component. In one embodiment, the substrate coupling device 720 may be an adhesive, such as those described above. However, in other embodiments, the substrate coupling device 720 may be one or more fasteners, such as screws, bolts, clamps, etc. Further, the substrate coupling device 720 may be an ultrasonic weld. Similar to the coupling devices described above, the substrate coupling device 720 should provide a sufficiently rigid coupling to the secondary load path component such that any tensional loading of the secondary load path component is transferred to the substrate 714.

The load monitoring device 700 operates similarly to the load monitoring devices described above. Specifically, when a sufficient tensional loading force is transmitted to the non-conductive pressure vessel 702 from a secondary load component, a failure is induced in the non-conductive pressure vessel 702. In one embodiment, a failure of the non-conductive pressure vessel 702 results in a breach of the non-conductive pressure vessel 702 such that the conductive substance 704 may be released from the non-conductive pressure vessel. For example, where the conductive substance 704 is a conductive gas, upon a failure of the non-conductive pressure vessel 702, the conductive gas may vent to the outside atmosphere, where the outside atmosphere is at a pressure less than or equal to the internal pressure of the non-conductive pressure vessel 702. In some embodiment, the non-conductive pressure vessel 702 may be a double walled pressure vessel with an outer pressure vessel having a pressure less than or equal to the pressure of an inside pressure vessel. This may be used where the outside pressure is expected to exceed the internal pressure of the atmosphere, or where it is advantageous to prevent the conductive substance 704 from being released into the atmosphere.

The loss of the conductive substance 704 within the non-conductive cylinder 702 results in a loss of conductivity across the non-conductive pressure vessel 702, which may be detected by the above described monitoring device, indicating a tensional load was present on the secondary load path. Furthermore, the load monitoring device 700 is capable of detecting axial loading, radial loading, and torsional loading in either compression or tension. Once the non-conductive pressure vessel 702 is breached due to the application of a load, the conductive substance 704 is released, eliminating the conductivity through the non-conductive pressure vessel 702. Accordingly, the load monitoring device 700 does not require tensional loading, to indicate a load is present.

Figure 7B:
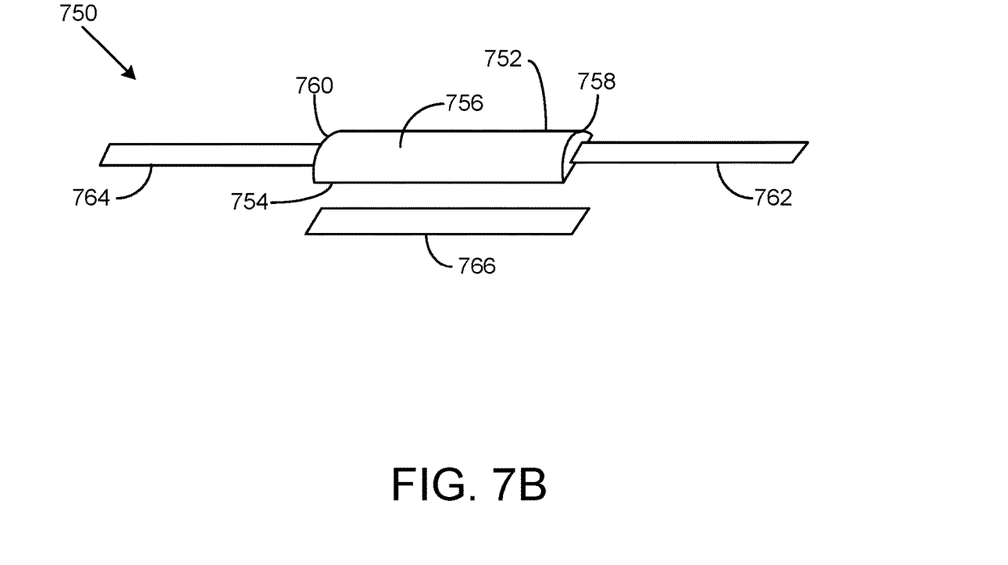

FIG. 7B provides an additional alternative embodiment, similar to that shown in FIG. 7A. FIG. 7B illustrates a load monitoring device 750 having a non-conductive pressure vessel 752 in the form of a semi-circular non-conductive cylinder. As shown, the non-conductive pressure vessel 752 may include a flat portion 754 and be filled with a conductive substance 756, which may be the same conductive substance as the conductive substance 704, described above. The non-conductive pressure vessel 752 may further have a first conductive end cap 758 and a second conductive end cap 760. The conductive end caps 758, 760 may be coupled to the ends of the non-conductive pressure vessel 752 to seal the conductive substance 756 within the non-conductive pressure vessel 752. Further, the load monitoring device 750 may have electrical leads 762, 764 coupled to the conductive end caps 758, 760, respectively. The electrical leads 762, 764 may further be coupled to a monitoring device (not shown), to monitor for an electrical continuity between the electrical leads 762, 764.

The flat portion 754 may be coupled to a secondary load path component via a coupling device 766. In one embodiment, the coupling device 766 may be an adhesive, such as those described above. However, in other embodiments, the coupling device 766 may be one or more fasteners, such as screws, bolts, clamps, etc. Further, the coupling device 766 may be an ultrasonic weld. Similar to the coupling devices described above, the coupling device 766 should provide a sufficiently rigid coupling to the secondary load path component such that any tensional loading of the secondary load path component is transferred to the semi-circular non-conductive cylinder 752. The flat portion 756 may allow the non-conductive pressure vessel 752 to be coupled directly to the secondary load path component without the need for a substrate where the secondary load path component has a similarly flat surface. Similar to above, when a sufficient load is present on the secondary load path component, the non-conductive pressure vessel 752 may fail as described above, resulting in a loss of electrical continuity across the non-conductive pressure vessel 752.

The embodiments provided in FIGS. 7A and 7B are for example only, and provide alternative embodiments of the load monitoring devices described in FIG. 1. It is contemplated that the monitoring devices described in FIGS. 7A and 7B may also be enclosed in an enclosure as described in FIG. 1. Further, other embodiments are contemplated based on the operation of the load monitoring devices described in FIGS. 7A and 7B. For example, other configurations of the non-conductive pressure vessels of FIGS. 7A and 7B are considered, such as other shapes (rectangular shaped, triangular shaped) of the non-conductive pressure vessels. Any shape is contemplated provided that the non-conductive pressure vessel is pressure sealed. Further, in some embodiments, a failure region may be added to the non-conductive pressure vessels. For example, the non-conductive pressure vessels may be scored in a location to reduce the force required to cause a failure of the non-conductive pressure vessel. Additionally, while the above load monitoring devices described in FIGS. 7A and 7B are described as monitoring a secondary load path component for a tensional load, the load monitoring devices may also be used to determine a max loading condition, or any other function described by the load monitoring circuit of FIG. 1.

Figure 8:
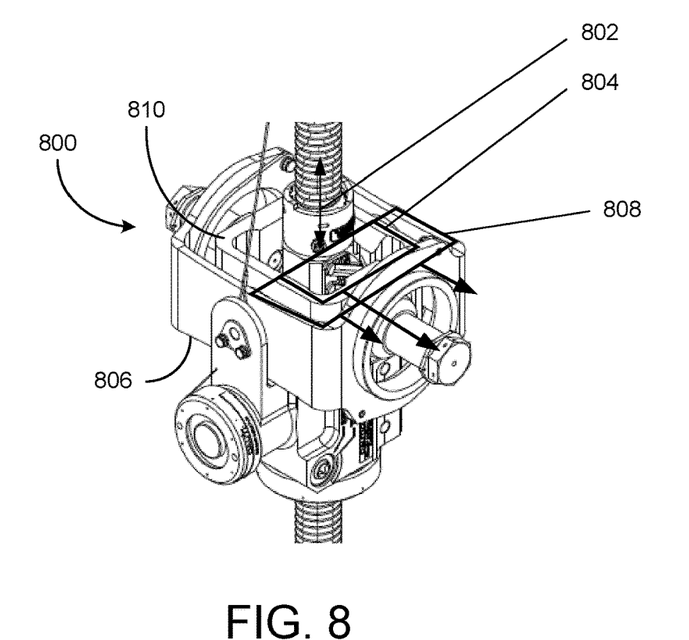
FIG. 8 is a system view of an example dual load path system, according to some embodiments.

Turning now to FIG. 8, an example dual load path system is shown, according to some embodiments. As shown in FIG. 8, the dual load path system is a gimbal ring assembly 800, as may be used on a trim actuator in an aircraft. The gimbal ring assembly 800 may have a load applied in a vertical direction at loading point 802. The load may be applied to the loading point 802 as a compression load, or a tensional load. A primary load path 804 is further shown on a primary load ring 806. The primary load path is 802 the primary path the applied load is intended to take through the gimbal ring assembly 800. Further, a secondary load path 808 is shown on a secondary load ring 810. The secondary load path 808, as described above, should be unloaded during normal operation, and should only be load when there is a failure in the primary load path 804.

Figure 9:
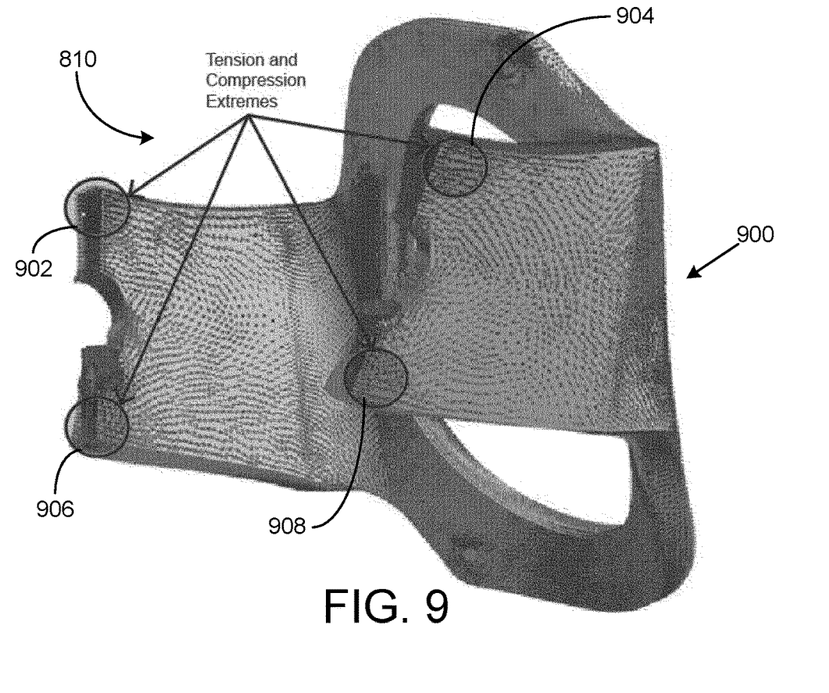
FIG. 9 is a strain plot illustrating a strain analysis of the secondary load ring of FIG. 8, according to some embodiments.

Turning now to FIG. 9, a strain analysis 900 of the secondary load ring 810 is shown. The secondary load ring 810 is shown to include four points of high intensity loading 902, 904, 906, 908 when a load is applied to the loading point 802. Loading points 902, 904 show high intensity tensional loading and loading points 906, 908 show high intensity compression loading. However, loading points 902, 904 may show high intensity compression loading and loading points 906, 908 may show high intensity tensional loading when the direction of the applied load on the loading point 802 changes direction (e.g. varies between tensional loading and compression loading.). These high intensity loading points 902, 904, 906, 908 may be used as the critical points on which to install load monitoring devices, such as those described above, to determine if loading is present on the secondary load path 808 during operation where the primary load path 804 is properly functioning.

Figure 10:
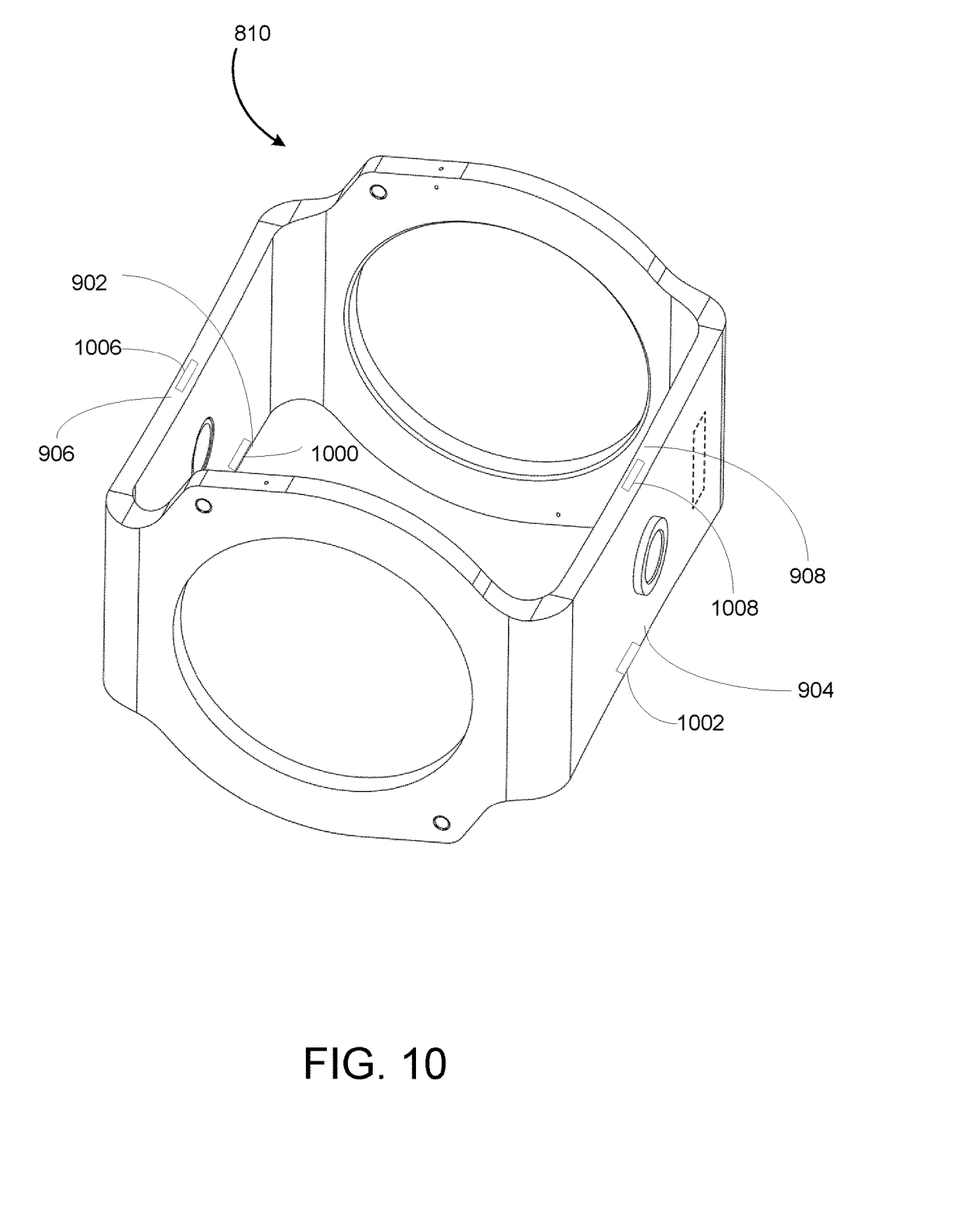
FIG. 10 is a perspective view of the secondary loading ring of FIG. 8, according to some embodiments.

Turning now to FIG. 10, a perspective view of the secondary loading ring 810 is shown. The high intensity loading points 902, 904, 906, 910 are further shown. A number of load monitoring devices 1000, 1002, 1004, 1006 are further shown, coupled to the secondary loading ring at each of the high intensity loading points 902, 904, 906, 908. However, in some embodiments, only two load monitoring devices may be needed. For example, load monitoring devices 1000, 1002, are coupled at high intensity loading points 902, 904, and load monitoring devices 1004, 1006 are coupled at high intensity loading points 906, 908. As high intensity loading points 902, 904 both experience a compression load when high intensity loading points 906, 908 experience a tensional load, and vice versa; only one of the high intensity loading points 902, 904 and one of the high intensity loading points 906, 908 require load monitoring devices in order to detect a load placed on the secondary load path. For example, where the load monitoring devices only detect tensional loads, such as those described above, at least one of high intensity loading points 902, 904 or high intensity loading points 906, 908 will experience a tensional load when a load is applied to the loading point 802 and load is present on the secondary load path 808, regardless of whether the load applied to the loading point 802 is a compression load or a tensional load.

As described above, the load monitoring devices 1000, 1002, 1004, 1006 may be configured to indicate a load is present, or a maximum load has been exceeded, on the secondary load path. The load monitoring devices 1000, 1002, 1004, 1006 may then provide that data to a monitoring device, as described above. The above systems described in FIGS. 8-10 are for example purposes only, and are not intended to limit the application of the inventive concepts described above.

The exemplary embodiments and representations illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

Embodiments of the inventive concepts disclosed herein have been described with reference to drawings. The drawings illustrate certain details of specific embodiments that implement the systems and methods of the present disclosure. However, describing the embodiments with drawings should not be construed as imposing any limitations that may be present in the drawings.

The foregoing description of embodiments has been presented for purposes of illustration and description. It is not intended to be exhaustive or to limit the inventive concepts disclosed herein to the precise form disclosed, and modifications and variations are possible in light of the above inventive concepts or may be acquired from practice of the inventive concepts disclosed herein. The embodiments were chosen and described in order to explain the principals of the disclosed inventive concepts and their practical application to enable one skilled in the art to utilize the disclosed inventive concepts in various embodiments and with various modifications as are suited to the particular use contemplated. Other substitutions, modifications, changes and omissions may be made in the design, operating conditions and arrangement of the embodiments without departing from the scope of the inventive concepts disclosed herein.

What is claimed is:

1. A load monitoring device configured to monitor a load path, the device comprising:
 a substrate having a first surface, the substrate is non-conductive;
 a conductive portion coupled to the first surface of the substrate comprising a first portion, a second portion, and a failure region separating the first portion and the second portion, the first portion, the second portion, and the failure portion extending along a first axis, the conductive portion pre-tensioned to induce a failure in the failure region when a predefined amount of tensional force is applied along a second axis parallel to the first axis to the substrate, the conductive portion having a first thickness less than a second thickness of the substrate; and
 a plurality of securing devices configured to couple the first portion and the second portion of the conductive portion to the substrate, the plurality of securing devices including a non-conductive material in contact with the first portion, the second portion, and the substrate, the plurality of securing devices configured to hold the conductive portion under tension by applying a clamping force on the first portion, the second portion, and the substrate.

2. The device of claim 1, further comprising a coupling device configured to couple a second surface of the substrate to a load path component.

3. The device of claim 2, wherein the coupling device is an adhesive.

4. The device of claim 1, wherein a failure in the failure region results in a loss of continuity between the first portion and the second portion.

5. The device of claim 1, wherein a monitoring device is in communication with the first portion and the second portion and configured to determine if there is an electrical continuity across the conductive portion of the device.

6. The device of claim 1, wherein the conductive portion is a conductive metallic foil.

7. The device of claim 6, wherein the metallic foil is steel foil.

8. The device of claim 1, wherein the conductive portion is a sealed pressure vessel containing a conductive substance.

9. The device of claim 8, wherein the conductive substance is one of a conductive liquid and a conductive gas.

10. The device of claim 1, wherein the plurality of securing devices include a plurality of gripping surfaces configured to couple the first portion and the second portion to the substrate.

11. A system for monitoring for the presence of a load on a secondary load path of an aircraft, the system comprising:
 a load monitoring device, the load monitoring device comprising:
  a substrate having a first surface, the substrate is non-conductive;
  a conductive portion coupled to the first surface of the substrate comprising a first portion, a second portion, and a failure region separating the first portion and the second portion, the first portion, the second portion, and the failure portion extending along a first axis, the conductive portion having a first thickness less than a second thickness of the substrate; and
  a plurality of securing devices configured to couple the first portion and the second portion of the conductive portion to the substrate, the plurality of securing devices including a non-conductive material in contact with the first portion, the second portion, and the substrate, the plurality of securing devices configured to hold the conductive portion under tension by applying a clamping force on the first portion, the second portion, and the substrate;
 a coupling device configured to couple the load monitoring device to a secondary load component; and
 wherein the load monitoring device is configured to deform axially along the first axis when a tensional force is applied to the secondary load component along a second axis parallel to the first axis, the load monitoring device further configured to induce a failure in the failure region of the load monitoring device when the tensional force is sufficient to overcome the strength of the failure region.

12. The system of claim 11, wherein the conductive portion is pre-tensioned to induce a failure in the failure region when a predefined amount of tensional force is applied to the secondary load component.

13. The system of claim 11, wherein the conductive portion is a conductive metallic foil.

14. The system of claim 11, further comprising a continuity monitoring device, wherein the continuity monitoring device is configured to determine if there is an electrical continuity across the conductive portion of the monitoring device.

15. The system of claim 11, wherein the monitoring device is one of a magnetic field detector and an electrical field detector.

16. A method for monitoring loading of a secondary load path, the method comprising:
 determining a loading of the secondary load path that cannot be exceeded;
 configuring a load monitoring device to lose electrical conductivity between a first portion and a second portion when the loading value has been exceeded, the load monitoring device including a non-conductive substrate having a first surface, a conductive portion coupled to the first surface of the substrate comprising the first portion, the second portion, and a failure region separating the first portion and the second portion, the first portion, the second portion, and the failure portion extending along a first axis, and a plurality of securing devices configured to couple the first portion and the second portion of the conductive portion to the substrate, the plurality of securing devices including a non-conductive material in contact with the first portion, the second portion, and the substrate;
 coupling the load monitoring device to the secondary load path using a coupling device; and
 monitoring the load monitoring device to determine when a loss of electrical conductivity has occurred.

17. The method of claim 16, wherein configuring the load monitoring device comprises pre-tensioning a conductive foil having a failure region to generate a failure at the failure region when the loading value has been exceeding, and coupling the conductive foil to a substrate of the load monitoring device.

18. The method of claim 17, wherein the failure region fails when the loading force exceeds the strength of the foil material multiplied by the cross-sectional area of the failure region.

* * * * *